Feb. 18, 1930.          J. A. GREGOVSKY          1,747,867
                         BALL BEARING
                      Filed April 30, 1928
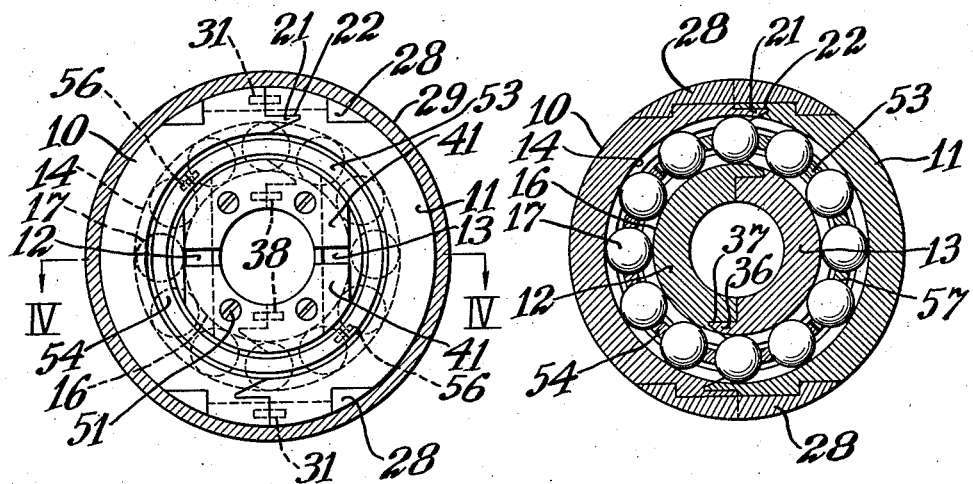
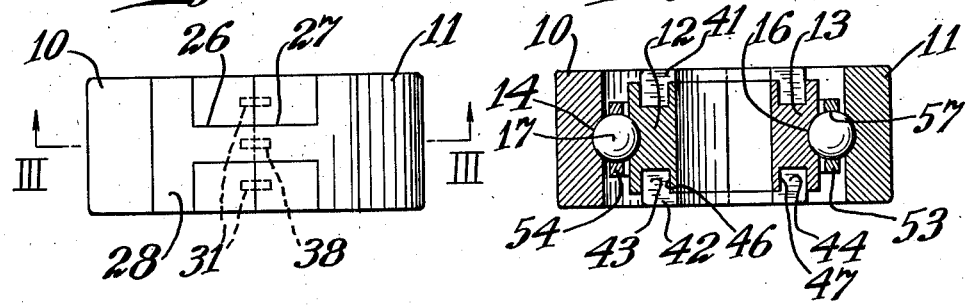
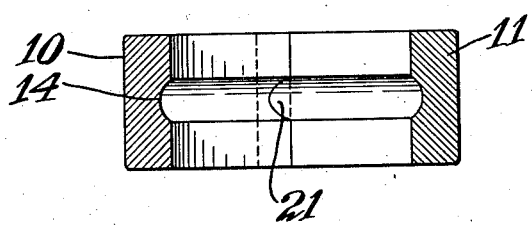
Inventor
J.A. Gregovsky
By Johnston & Jennings
Attorneys Patented Feb. 18, 1930

1,747,867

UNITED STATES PATENT OFFICE

JOSEPH A. GREGOVSKY, OF BIRMINGHAM, ALABAMA, ASSIGNOR OF ONE-THIRD TO MARION L. STANSELL AND ONE-THIRD TO ROBERT F. COONEY, BOTH OF BIRMINGHAM, ALABAMA

BALL BEARING

Application filed April 30, 1928. Serial No. 273,983.

My invention relates to ball bearings having separable races and has for its object the provision of a device of the character designated which shall be simple of design and easy of manufacture and which may be readily assembled or disassembled.

A further object of my invention is to provide a ball bearing having separable races and in which the line of contact of the track portion joints with the balls is oblique to the direction of travel of the balls, thereby providing a practically smooth track for the balls.

A still further object of my invention is to provide a ball bearing having separable races and which may be readily assembled and disassembled on a shaft in a minimum of space.

Briefly my invention comprises segmental inner and outer races for the ball bearing, the segments preferably being semi-cylindrical in form, and provided with the usual grooved track for the balls. The joints between the segments form an important feature of my invention and are so made that the lines of contact with the balls and the track, on both the outer and inner races, are oblique to the direction of travel of the balls. This feature insures that there shall be no undue wear of the balls on the track on passing the line joints between the segments which has been found to result with divided ball bearings, where the line of contact with the balls and the joints between the segments in the grooves was normal to the direction of travel of the balls. Both the outer and inner races are held together by a novel key means movable into and out of position in a direction radial to the bearing. By this means I am enabled to mount the bearing on a shaft in a minimum of space.

Apparatus embodying features of my invention is illustrated in the accompanying drawings, forming a part of this application, wherein Fig. 1 is a side elevation of the bearing;
Fig. 2 is a plan view thereof;
Fig. 3 is a sectional view along the line III—III of Fig. 2;
Fig. 4 is a sectional view along the line IV—IV of Fig. 1; and
Fig. 5 is a sectional view similar to Fig. 4 with the inner race removed.

Referring to the drawings, my improved bearing comprises an outer race made up of segments 10 and 11 and an inner race made up of segments 12 and 13, said segments preferably being semi-cylindrical in form. The outer segments are each provided with a similarly grooved track 14, and the inner segments with a similarly grooved track 16, the radii of the grooves being slightly longer than the radii of the balls 17 running in the track.

Each of the segments 10 and 11 is provided, on one side, with a V-shaped projection 21 and on the other side with a V-shaped groove 22, the projection 21 on the one side fitting into the groove 22 on the diametrically opposite side of the other segment. The grooves 21 and the protuberances 22 bisect the track 14 at an acute angle so that the balls 17, in passing over the joints thus formed, bear upon the lines of contact in the track in a direction oblique to the direction of travel of the balls. This feature insures that the balls will roll smoothly from one segment to the other as if a solid race were used.

Formed in the outer surface of the races 10 and 11 are similarly positioned T grooves 26 and 27 which meet at the joint between the segments and in which fits an I-shaped key 28 to hold the segments together. The key 28 is readily insertible in the slots 26 and 27 in a direction radial to the bearing whereby the bearing may be assembled on a shaft in close places, such as adjacent to a crank. Ordinarily, the keys 28 are held in place by a bearing housing 29. If desired, however, the keys 28 may be designed to be heated and shrunk in place in the grooves 26 and 27.

In order to insure that the two segments of the outer race shall be properly positioned axially with respect to each other, I provide a plurality of dowels 31 fitting in complementary positioned holes in the respective segments.

Each of the segments 12 and 13 of the inner race is provided with a V-shaped tongue 36 on one side thereof and a similarly shaped grooved 37 on the side thereof diametrically opposed thereto, the tongue on one segment fitting into the groove of the other segment and the tongues and grooves bisecting the grooved track 16 in the same manner as has already been explained with respect to the tongues 21 and 22 bisecting the track 14. Thus the lines of contact of the balls with both the outer and inner track at the joints between the segments are oblique to the direction of travel of the balls.

The segments of the inner race are positioned axially by means of dowels 38 which fit in suitably formed holes in the opposing segments.

The two halves 12 and 13 of the inner race are held together by arcuate keys 41 and 42. Each of the arcuate keys 41 and 42 is provided with lugs 43 and 44 which fit in complementary grooves 46 and 47 formed in the segments 12 and 13 respectively. A pair of keys 41 are arranged on diametrically opposed sides of the inner race as may best be seen in Fig. 1, while a pair of keys 42 are similarly arranged on the other side of the inner race, axially from the keys 41. The slots 43 and 44 extend in a direction parallel to the line of jointure of the segments whereby the keys 41 and 42 may be inserted radially of the bearing.

The keys 41 and 42 may be held in place in the slots by being heated and shrunk into the slots or, if preferred, axially extending screws 51 may be provided through the keys and into the bodies of the segments to hold them in place. If the screws are employed, there is no need of heating and shrinking the keys in place. Where there is insufficient room at the side of the bearing to insert the screws 51, it is preferable to shrink the keys in place.

In order that the bearing may be more readily assembled, I provide a ball retainer comprising semi-cylindrical rings 53 and 54 held together in proper axial relation by means of dowels 56. Each of the semi-cylindrical rings 53 and 54 is provided with holes 57 in which the balls fit and the metal around the balls is peened over to prevent the balls falling out.

From the foregoing it will be apparent that I have devised an improved separable ball bearing which is easily assembled and disassembled and which provides a remarkably smooth track for the balls along the lines of jointure between the separable members of the bearing. Due to the feature of the radially insertible key members for holding the segments together, the bearing may be assembled in close places such as could not be gotten at with tools at the side of the bearing. In the manufacture of my improved bearing, all machining, such as boring and slotting, is along straight lines whereby the parts may be made in multiple, thereby greatly cheapening the manufacture thereof.

It will also be appreciated that any desired number of rows of balls may be used in the bearing.

While I have shown my invention in but one form, it will be obvious to those skilled in the art that it is not so limited but is susceptible of various changes and modifications without departing from the spirit thereof and I desire therefore that only such limitations shall be placed thereupon as are imposed by the prior art or as are specifically set forth in the appended claims.

What I claim is:

1. In a separable ball bearing an outer race comprising segmental members having radially extending T-shaped grooves formed in their outer peripheries, said grooves meeting at the line of juncture of the segmental members, and arcuate I-shaped keys fitting in the grooves to join the segmental members together.

2. In a separable ball bearing an outer race comprising segmental members having radially extending T-shaped grooves formed in their outer peripheries, said grooves meeting at the line of juncture of the segmental members, arcuate I-shaped keys fitting in the grooves to join the segmental members together, an inner race comprising segmental members having grooves extending from the outer periphery parallel to the diameter of the race, and keys spanning the line of juncture of the members and fitting in the grooves, said keys being insertable radially of the race.

3. In a ball bearing, segmental outer and inner races provided with means to effect a positive alignment of the segments when assembled to form races for the balls, the segments forming the outer race being provided with grooves or keyways in their outer peripheral surfaces, keys adapted to seat in the grooves to maintain said outer segments in positive alignment, and means to maintain the keys in position.

In testimony whereof I affix my signature.

JOSEPH A. GREGOVSKY.